United States Patent

[11] 3,612,696

[72] Inventor Arthur B. Broerman
 Bartlesville, Okla.
[21] Appl. No. 792,554
[22] Filed Jan. 21, 1969
[45] Patented Oct. 12, 1971
[73] Assignee Phillips Petroleum Company

[54] REFRACTOMETER
 6 Claims, 4 Drawing Figs.
[52] U.S. Cl. .................................................. 356/128
[51] Int. Cl. ............................................... G01n 21/46
[50] Field of Search .......................................... 356/128, 137

[56] References Cited
 UNITED STATES PATENTS
 830,225 9/1906 Haber .......................... 356/130
 2,064,517 12/1936 Brice ........................... 356/222
 3,323,410 6/1967 Waters ......................... 356/136 X Primary Examiner—Ronald L. Wibert
Assistant Examiner—Conrad Clark
Attorney—Young and Quigg ABSTRACT: A refractometer cell comprises a housing forming a chamber through which radiation can be transmitted, said chamber being adapted to receive a test fluid. A radiation-transparent refracting means is positioned within the chamber. In one embodiment, this refractive means is a spherically shaped element. In another embodiment, the refractive means comprises two spaced elements having concave spherically shaped surfaces facing one another.

PATENTED OCT 12 1971 3,612,696

INVENTOR.
A. B. BROERMAN

REFRACTOMETER

In various analytical procedures there is a need for apparatus which is capable of detecting changes in composition of fluid streams. One specific example of such a need occurs in the field of chromatography. While various types of thermistor cells and flame detectors have been developed for use in gas chromatography, there remains a need for reliable, low-cost detectors for use in liquid chromatography. One proposal for measuring changes in composition of the effluent stream from such a chromatographic column has been to use a refractometer. Although various types of refractometers are well known, few of the available instruments are adequate for use as detectors in chromatographic analyzers. In this application, the refractometer must be provided with an extremely small sample chamber in order to provide a rapid response to changes in composition of the column effluent. It is also necessary that the instrument have a high degree of sensitivity.

In accordance with this invention, improved refractometers are provided which are quite sensitive and which can have extremely small sample chambers. In one embodiment of this invention, a transparent sphere is disposed in the central region of a housing establish two fluid compartments on opposite sides of the sphere. Transparent closure members are secured to the ends of the housing. Light from an external source is passed through the first compartment, the sphere, and the second compartment to a radiation detector. In this manner, a substantial portion of the radiation is reflected in passing through the sphere so that the radiation received by the detector is a function of the relative refractive indices of fluids occupying the two chambers. A central light stop can advantageously be employed adjacent the inlet of the housing, and an annular light stop can be positioned adjacent the outlet. These light stops reduce the amount of radiation passed through the sphere to the detector, so that the sensitivity of the instrument is increased.

In another embodiment of this invention, the sphere is replaced with a pair of planoconcave lenses which are spaced from one another such that the sample to be measured can be passed between the lenses. In this manner, the sample occupies a region which corresponds to the spherical reflective element of the first embodiment, and the lenses occupy regions corresponding to the sample compartments in the first embodiment. Two cells of this type can be employed in conjunction with a common radiant source to provide a differential refractometer wherein fluids to be compared occupy the central chambers of the two cells.

Accordingly, it is the object of this invention to provide improved refractometers.

Figure 4:
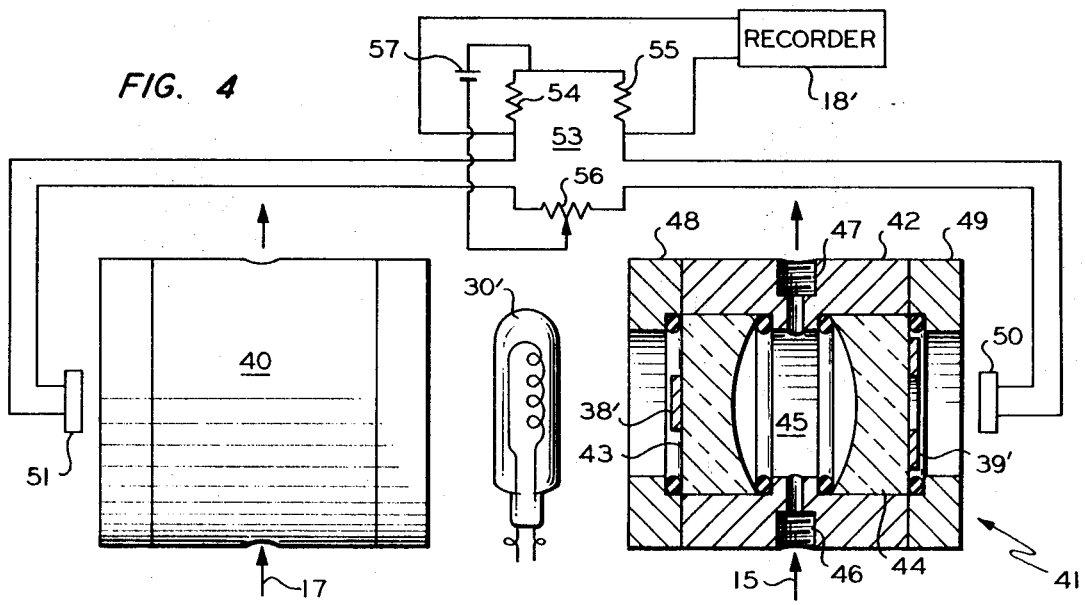
Figure 1:
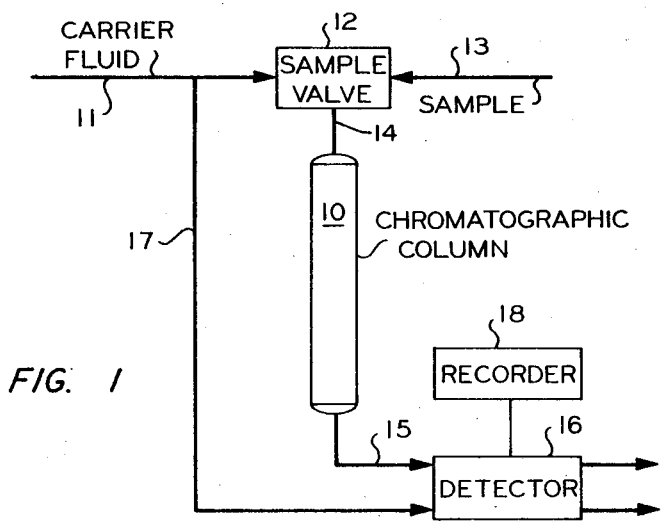
FIG. 1 is a schematic representation of a chromatographic analyzer having the refractometer of this invention employed as the detector.

FIG. 4 illustrates a second embodiment of a refractometer constructed in accordance with this invention. Referring now to the drawing in detail and to FIG. 1 in particular, there is shown a chromatographic column 10. A carrier fluid, which can be a suitable liquid, is introduced through a conduit 11 which communicates with a sample valve 12. A sample of material to be analyzed is introduced through a conduit 13 which communicates with sample valve 12. A conduit 14 extends from sample valve 12 to the inlet of column 10, A conduit 15 passes the effluent from column 10 to the first chamber of a detector 16. A portion of the carrier fluid is passed through a conduit 17 to the second channel of detector 16. The output signal from detector 16 is transmitted to a recorder 18.

The apparatus thus far described constitutes a conventional chromatographic analyzer. Carrier fluid initially passes through a column 10 so that the same fluid flows through both channels of detector Periodically, periodically, valve 12 is actuated to introduce a predetermined volume of the sample material into column 10. Valve 12 is then returned to the original position so that the carrier fluid forces the sample through the column. The appearance of the constituents of the sample in the effluent form column 10 results in unbalance of detector 16 so that a signal is applied to the recorder which is representative of the sample constituents in the column effluent. In accordance with an embodiment of this invention, detector 16 constitutes a differential refractometer.

Figure 2:
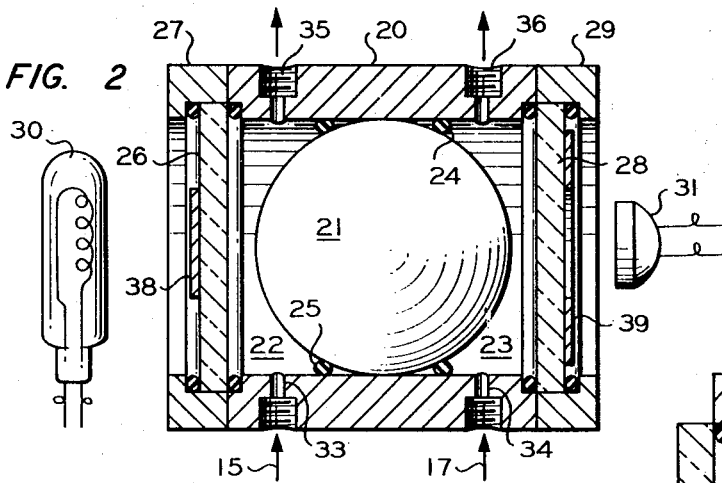
FIG. 2 is a view, shown particularly in section, of a first embodiment of the differential refractometer which is employed as the detector in the analyzer of FIG. 1.

A first embodiment of the refractometer of this invention is illustrated in FIG. 2. The refractometer cell comprises a cylindrical housing 20 having an optically transparent sphere 21 positioned centrally therein to divide the interior chamber of the housing into two compartments 22 and 23. O-rings 24 and 25, or other suitable sealing means, can be employed to insure a fluidtight seal between housing 20 and sphere 21. A first transparent plate 26 is positioned across one end of housing 10 and retained in position by means of an annular ring 27. Ring 27 can be attached to housing 20 by a plurality of setscrews, not shown. In similar fashion, a plate 28 is secured to the second end of housing 20 by a retaining ring 29. A radiation source 30 is positioned adjacent one end of housing 20, and a radiation detector 31, which can be a photoconductive cell, is positioned adjacent the other end of the housing. Housing 20 is provided with two spaced inlet ports 33 and 34 which serve to permit introduction of fluids from respective conduits 15 and 17 of FIG. 1. Port 33 is in communication with compartment 22 and port 34 is in communication with compartment 23. These two compartments are provided with respective outlet ports 35 and 36.

Radiation from source 30 passes through transparent plate 26, compartment 22, sphere 21, compartment 23 and plate 28 to detector 31. The radiation transmitted through the peripheral regions of compartments 22 and 23 is reflected in passing through sphere 21. The sphere serves generally as a converging lens to direct radiation to detector 31. However, a portion of the radiation transmitted through compartment 22 strikes sphere 21 at greater than the critical angle, and as such is not passed through the sphere to detector 31. Accordingly, the amount of radiation received by the detector is a function of the refractive indices of fluids in compartments 22 and 23. If the refractive index of one of the fluids changes relative to the other, the amount of light received by the detector also changes. In view of the fact that light which normally would be transmitted through the central region of the sphere is not reflected to any appreciable extent, an opaque light stop 38 is advantageously secured to the central region of plate 26 to block this central radiation. Light stop 38, which can be a thin sheet of metal secured to plate 26, increases the sensitivity of the refractometer by reducing the total amount of radiation transmitted. In this manner, changes in refractive indices have a greater effect in changing the percentage of light transmission. In similar fashion, an annular opaque light stop 39 can be secured to plate 38 to reduce the amount of stray transmitted light. Light stop 39 can be adjustable to change the sensitivity of the instrument. Thus, any change in the amount of radiation received by detector 31 is indicative of changes in the relative reflective indices of the two fluids in compartments 22 and 23. The output signal from detector 31 is applied through a conventional amplifier to recorder 18 of FIG. 1.

Figure 3:
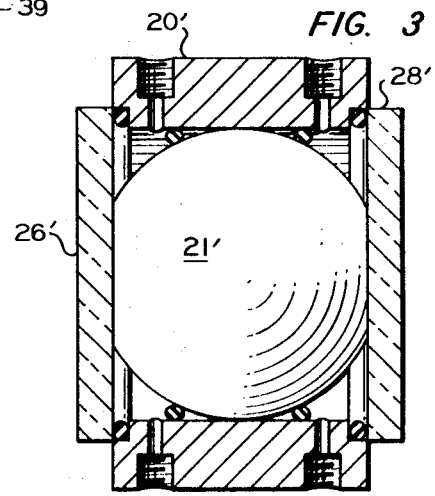
FIG. 3 illustrates a modified embodiment of a portion of the refractometer of FIG. 2.

In certain applications of this invention, it is desirable to reduce still further the volumes of the sample chambers and to shorten the effective focal length of the lens formed by sphere 21. Both of these objectives can be accomplished by removing the ends of sphere 21, as illustrated in FIG. 3 wherein sphere 21 is replaced by such an element 21'. The refractometer cell of FIG. 3 otherwise corresponds to that of FIG. 2 and like elements are designated by corresponding primed reference numerals. Light stop 38 of FIG. 2 can be replaced by a thin and metallic coating on the flat end surface of element 21' between this element and plate 26.

The refractometer cells of FIG. 2 and FIG. 3 are advantageously constructed by using solid transparent spheres, as illustrated. These spheres can readily be obtained commercially at nominal cost. Such spheres are ground to extremely fine tolerances. Radiation in the visible, infrared or ultraviolet regions can be employed, depending in part on the radiation-transmitting characteristics of the fluids being tested. When radiation is in the visible spectrum, sphere 21 can advantageously be constructed of sapphire. Spheres of this material are available commercially at quite low cost.

A second embodiment of the differential refractometer of this invention is illustrated in FIG. 4. The refractometer comprises two cells 40 and 41 which can be of identical construction. Cell 41 comprises a housing 42 having two planoconcave lenses 43 and 44 positioned therein. The two lenses are spaced from one another to provide a central chamber 45 which receives a test fluid. Housing 42 is provided with an inlet port 46, which can receive fluid from conduit 15 of FIG. 1. A similar port in cell 40 receives fluid from conduit 17. Housing 42 is provided with an outlet vent port 47. Lenses 43 and 44 are retained in housing 42 by respective clamping rings 48 and 49. Light stops 38' and 39' can be secured to respective lenses 43 and 44. Photoconductive cell 31 of FIG. 2 is advantageously replaced with a photoresistive element 50 which is positioned adjacent cell 41. A similar element 51 is positioned adjacent cell 40. Light from source 30' is transmitted through both cells to respective elements 50 and 51.

It can readily be seen that the apparatus of FIG. 4 is optically similar to that of FIG. 2, the difference being that the fluid chamber occupies the region previously occupied by the sphere, and the lenses occupy the regions previously occupied by the samples. In view of the fact that only a single sample chamber is provided, two cells are employed to form a differential refractometer. In those applications where it is not necessary to utilize a reference cell, a single cell is all that is required. The amounts of radiation transmitted through the two cells of FIG. 4 can readily be compared by means of the illustrated electrical circuit. Elements 50 and 51 are connected in a bridge network 53 so as to form two arms of the bridge. Resistors 54 and 55 form the remaining arms of the bridge, and a zero adjusting potentiometer 56 is connected between elements 50 and 51. A current source 57 is connected across first opposite terminals of the bridge and second opposite terminals are connected to a recorder 18'. The electrical network thus constitutes a form of Wheatstone bridge in which the resistances of elements 50 and 51 are compared to provide an indication of the amounts of light transmitted through the two cells, and thus a comparison of the refractive indices of the fluids passed through the two cells.

While this invention has been described in conjunction with presently preferred embodiments, it should be apparent that it is not limited thereto.

What is claimed is:

1. A refractometer comprising:
   a radiation source;
   a radiation detector spaced from said source; and
   a refractometer cell comprising a housing forming a cylindrical chamber having a radiation transparent opening at each end, and a generally spherically shaped solid element of radiation transparent material positioned within said chamber and spaced form said openings so as to divide said chamber into first and second compartments, each of which is adapted to contain a fluid, the refractometer indices of which are to be compared, said cell being positioned with respect to said source and said detector so that radiation from said source passes through said first compartment, said element and second compartment to said detector.

2. The refractometer of claim 1, further comprising a first radiation-opaque member positioned centrally in the opening of said cell adjacent said source to reduce the amount of radiation entering said cell, and an annular radiation-opaque member positioned in the opening of said cell adjacent said detector to reduce the amount of radiation which reaches said detector.

3. The refractor of claim 1, wherein the radiation-transparent openings of said housing comprise flat plates of radiation transparent material and wherein opposite edges of said spherically shaped element are in engagement with respective ones of said plates and are flattened to reduce the volumes of said compartments.

4. A refractometer comprising:
   a radiation source;
   a radiation detector spaced from said source; and
   a refractometer cell comprising a housing forming a cylindrical chamber having a radiation-transparent opening at each end, and first and second solid members of radiation-transparent material positioned in said chamber between said openings and in spaced relationship with one another to form a compartment therebetween which is adapted to contain a fluid, the surfaces of said elements adjacent one another being concave and generally spherically shaped, said cell being positioned with respect to said source and said detector so that radiation from said source passes through said first member, said compartment and said second member to said detector.

5. The refractometer of claim 4, further comprising a first radiation-opaque member positioned centrally in the opening of said cell adjacent said source to reduce the amount of radiation entering said cell, and an annular radiation-opaque member positioned in the opening of said cell adjacent said detector to reduce the amount of radiation which reaches said detector.

6. The refractometer of claim 5, further comprising a second radiation detector spaced from said source, a second refractometer cell of similar construction positioned between said source and said second detector, and means to compare the outputs of said detectors.

UNITED STATES PATENT OFFICE
CERTIFICATE OF CORRECTION

Patent No. 3,612,696         Dated October 12, 1971

Inventor(s) Arthur B. Broerman

It is certified that error appears in the above-identified patent and that said Letters Patent are hereby corrected as shown below:

Column 4, line 7, "form" should read -- from --; lines and 10, "refractometer" should read -- refractive --.

Signed and sealed this 30th day of May 1972.

(SEAL)
Attest:

EDWARD M. FLETCHER, JR.
Attesting Officer

ROBERT GOTTSCHALK
Commissioner of Patents